United States Patent [19]

Gullichsen

[11] 4,362,536

[45] Dec. 7, 1982

[54] PULP DEGASSING

[75] Inventor: Johan E. Gullichsen, Helsinki, Finland

[73] Assignee: Kamyr, Inc., Glens Falls, N.Y.

[21] Appl. No.: 271,174

[22] Filed: Jun. 8, 1981

[51] Int. Cl.³ .............................................. B01D 19/00
[52] U.S. Cl. ................................. 55/52; 55/191; 55/204
[58] Field of Search ............ 55/52, 190, 191, 199-205, 55/328, 400; 162/17, 65; 209/211; 210/512.1

[56] References Cited

U.S. PATENT DOCUMENTS

| | | | |
|---|---|---|---|
| 1,967,938 | 7/1934 | Jantzen et al. | 55/199 X |
| 2,216,542 | 10/1940 | Paige | 55/52 X |
| 2,277,651 | 3/1942 | Steele | 55/199 |
| 2,887,267 | 5/1959 | deLangen | 55/203 X |
| 3,249,227 | 5/1966 | Long | 55/199 X |
| 3,313,413 | 4/1967 | Delcellier | 209/211 |
| 3,371,783 | 3/1968 | Meyer et al. | 55/400 X |
| 3,407,569 | 10/1968 | Hendricks | 55/52 |
| 3,468,614 | 9/1969 | Nilsson | 55/52 X |
| 3,753,336 | 8/1973 | Drew et al. | 55/242 |
| 3,771,290 | 11/1973 | Stetham | 55/205 |
| 3,898,068 | 8/1975 | McNeil | 55/426 |
| 4,093,506 | 6/1978 | Richter | 162/17 |
| 4,209,359 | 6/1980 | Sethy | 55/52 X |
| 4,253,857 | 3/1981 | Fisher | 55/400 |

FOREIGN PATENT DOCUMENTS 656639 4/1979 U.S.S.R. ............... 55/204

*Primary Examiner*—Robert H. Spitzer
*Attorney, Agent, or Firm*—Cushman, Darby & Cushman

[57] ABSTRACT

Pulp degassification is effected by a structure that may be mounted on a pulp treatment vessel, such as an oxygen reactor blow tank. The degassifier includes a housing that is substantially circular in cross-section and tapers from a first end to a second end along a central axis. A pulp inlet is adjacent the first end and introduces pulp tangentially and an outlet is adjacent the second end extending concentrically with the central axis. A blade assembly is mounted for rotation about an axis generally coincident with the housing central axis, and the blade assembly is rotated to impart a high speed rotational velocity component to the pulp as it enters the housing. A gas outlet is adjacent the housing first end, vertically above the housing second end, and adjacent the central axis. A conically shaped baffle or the like is provided surrounding the gas outlet to prevent short-circuiting of pulp from the inlet to the gas outlet.

7 Claims, 4 Drawing Figures

PULP DEGASSING

BACKGROUND AND SUMMARY OF THE INVENTION

The invention relates to an apparatus, system, and method for degassification of a fiberous suspension, particularly a medium consistency (i.e., about 6 to 15%) pulp. In many operations relating to the production and transfer of paper pulp, gases are introduced into the fiberous suspension. The gases become entrained in the pulp and form an emulsion, and can present difficulties in the subsequent processing of the pulp, such as the washing, pumping, and bleaching thereof. According to the present invention, the adverse effects of gases emulsified in pulp may be avoided by removing the gases from the pulp in a simple and effective manner by imparting high speed velocity components to the pulp and passing with a whirling motion in a decreasing diameter circular, axial path.

Heretofore, it has been known to impart a whirling motion to pulp for various purposes. For instance U.S. Pat. No. 3,313,413 teaches a separation of dirt particles and like undesirable solid materials, along with air bubbles, from pulp to clean the pulp. Further, as taught by U.S. Pat. No. 4,093,506, it is known to utilize a blade assembly to impart a high speed rotational movement to pulp while introducing liquids to be mixed therein to provide fluidization of the pulp and thus effective mixing of the components. Also, it is known from U.S. Pat. No. 3,771,290 to de-aerate a flowing liquid, such as water, by imparting a whirling action thereto. However heretofore an effective mechanism for degassification medium consistency (i.e., about 6 to 15%) pulp has not been utilized.

According to the present invention the degassification of medium consistency pulp is accomplished in a simple and effective manner. A pulp degassifier is provided which includes the following elements: A housing substantially circular in cross-section and tapering inwardly from a first end thereof toward a second end thereof along a central axis. Means defining a pulp inlet to the housing adjacent the first end thereof, the pulp inlet extending along a line intersecting a plane containing the central axis (e.g., the pulp inlet is tangential). Means defining a pulp outlet adjacent the second end of the housing, the pulp preferably being concentric with the central axis. A blade assembly, and means for mounting the blade assembly adjacent the pulp inlet for rotation about an axis generally coincident with the housing central axis, and means for rotating the blade assembly about the axis so that the blade assembly imparts a high velocity to the pulp. Means defining a gas outlet adjacent the housing first end and adjacent the central axis; and means for preventing short-circuiting of pulp from the pulp inlet to the gas outlet.

The blade assembly includes blades having tapered radially-outwardmost edges thereof parallel to the taper of the housing, and the pulp inlet includes a pipe having a terminating end with the same taper and terminating in close proximity to the blades radially-outwardmost edges. The short-circuiting preventing means comprises a conical tube also having a taper corresponding substantially to the housing taper, and the radially-inwardmost edges of the blades preferably also have the same taper and overlap the conical tube in the axial direction. Preferably the means mounting the blade assembly for rotation comprises a shaft passing through an end cap at the housing first end, and the gas outlet comprises a plurality of openings in the end cap surrounding the shaft.

A degassifier according to the present invention preferably comprises part of a pulp treating system, and may be mounted atop a pulp treatment vessel. For instance, a degassifier according to the present invention would ideally be mounted on top of an oxygen reactor blow tank, gases being vented upwardly from the degassifier and the degassified pulp being discharged downwardly into the blow tank.

Utilizing the degassifier it is possible to effectively degassify pulp having a consistency of about 6 to 15%. The pulp is fed into the housing through the pulp inlet with a velocity component intersecting a plane containing the central axis of the housing (e.g., tangentially). The blade assembly is rotated to impart a high speed rotational velocity component to the pulp as it enters the housing. Movement of the pulp along the central axis of the housing toward the pulp outlet is effected while the gas within the pulp is being squeezed out. Gas separated from the pulp is withdrawn through the gas outlet adjacent the central axis and pulp inlet of the housing, and may be discharged into the atmosphere or may be treated to remove certain components thereof before discharge.

It is the primary object of the present invention to provide a simple and effective means for degassifying medium consistency paper pulp or the like. This and other objects of the invention will become clear from an inspection of the detailed description of the invention, and from the appended claims.

BRIEF DESCRIPTION OF THE DRAWINGS

FIG. 2 is a side detailed view of an exemplary pulp degassifier according to the invention;

FIG. 3 is a top plan view of the degassifier of FIG. 2; and

DETAILED DESCRIPTION OF THE DRAWINGS

Figure 1:
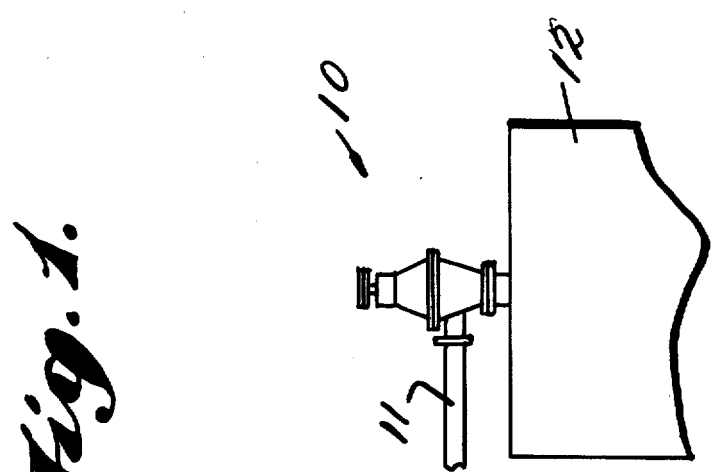
FIG. 1 is a side schematic view illustrating an exemplary pulp treatment system utilizing a pulp degassifier according to the invention.

An exemplary pulp degassifier according to the present invention is indicated generally by reference numeral 10 in the drawings. As illustrated in FIG. 1, the degassifier 10 preferably is incorporated in a pulp treating system including an inlet line 11 from some other pulp treatment operation. Preferably the degassifier 10 is mounted on top of a pulp treatment vessel 12. In the embodiment illustrated in FIG. 1, the treatment vessel 12 is illustrated as an oxygen reactor blow tank, although the degassifier 10 may be utilized with a wide variety of other types of pulp treatment equipment.

Figure 4:
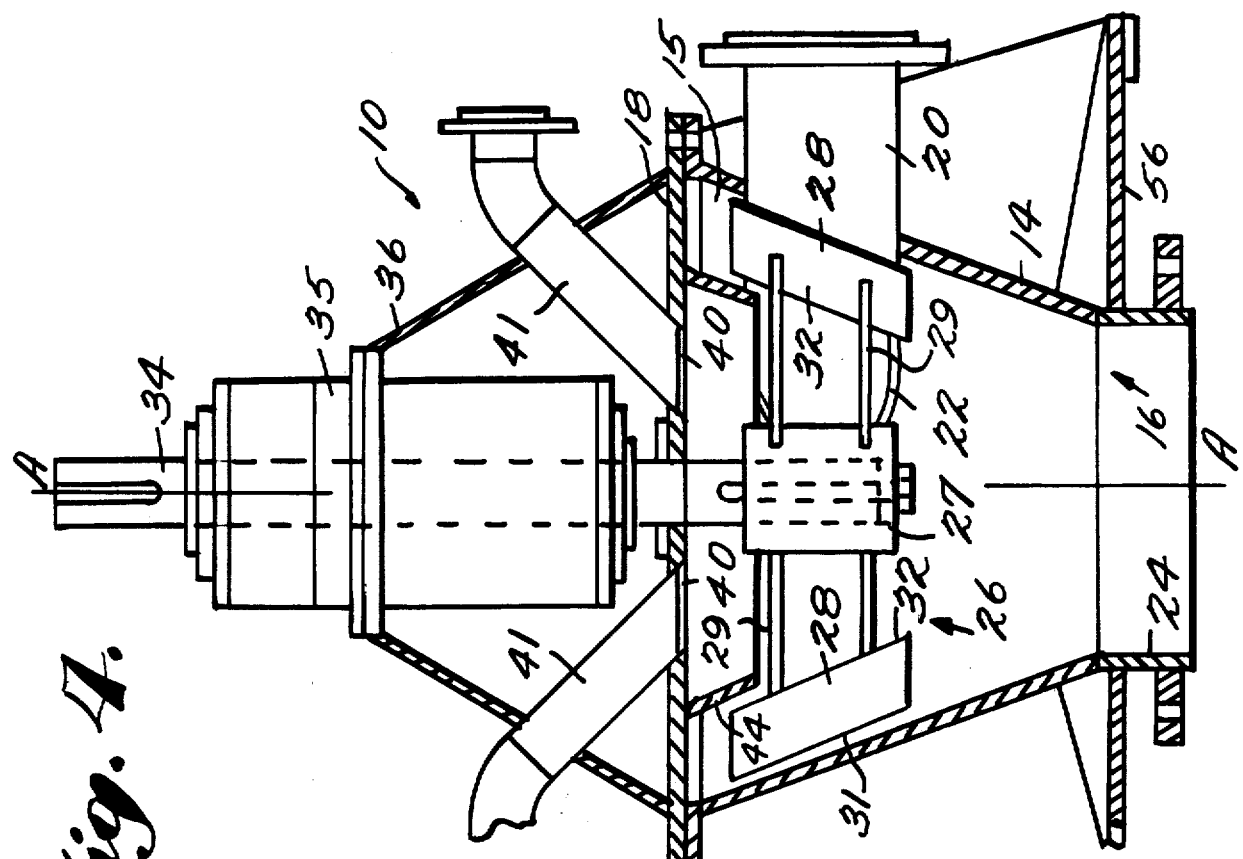
FIG. 4 is a side view, partly in cross-section and partly in elevation, illustrating in detail the interior components of the degassifier of FIGS. 2 and 3.
Figures 2, 3:
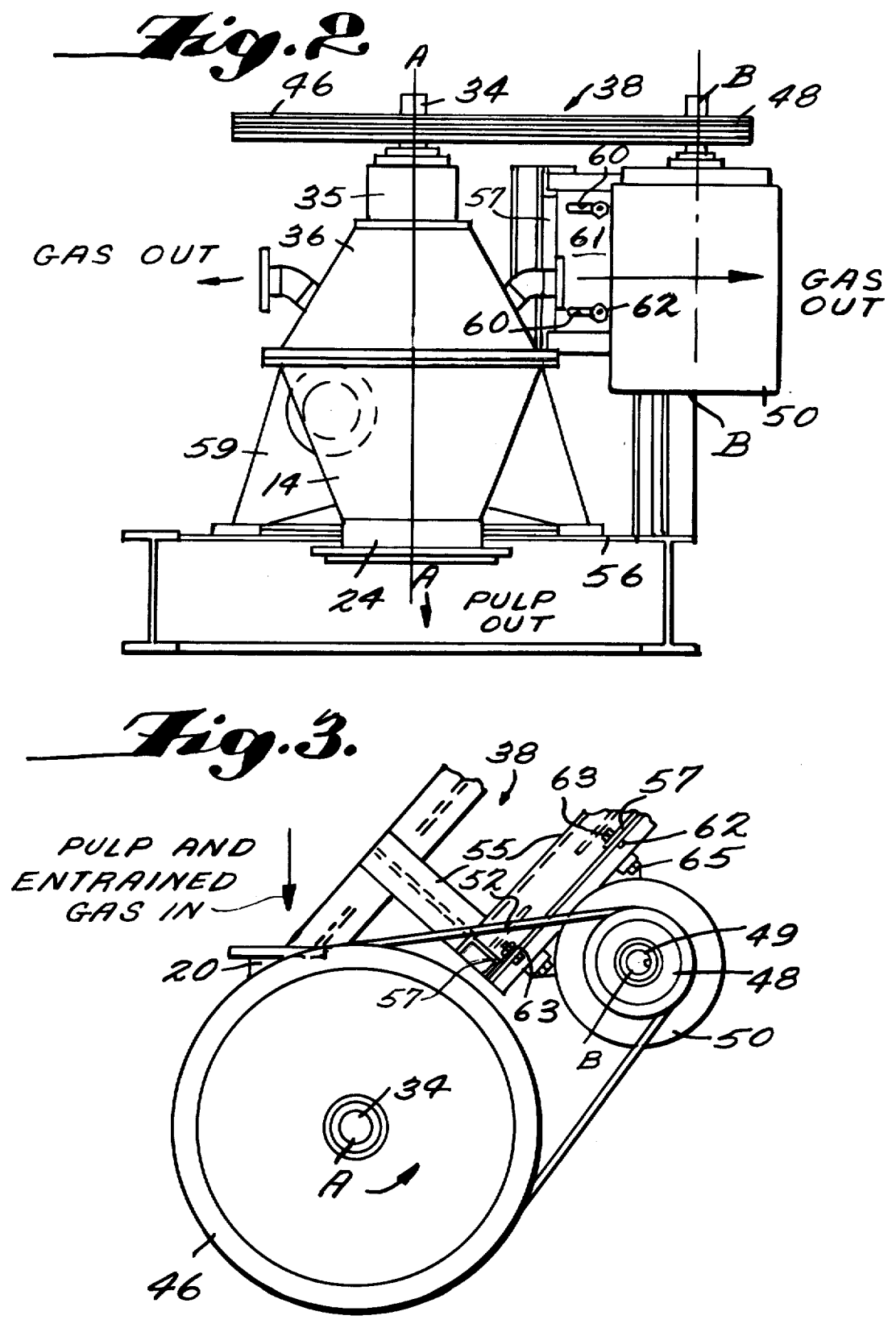

The degassifier 10 is most clearly illustrated in FIGS. 2 and 4. One important component of the degassifier comprises a housing 14, which housing is substantially circular in cross-section and tapers inwardly from a first end 15 thereof toward a second end 16 thereof along a central axis A—A. The first end 15 may be terminated with an end cap 18, and means are provided, such as pipe 20, defining a pulp inlet to the housing 14 adjacent the first end 15. Preferably the pipe 20 extends along a line intersecting a plane containing the central axis A—A, and introduces pulp into the interior of the housing 14 adjacent the wall of the housing 14. That is, the preferred introduction is tangential. As illustrated most clearly in FIG. 4, the end termination 22 of the pipe 20 is generally elliptical in shape, and extends inwardly only a small distance into the housing 14.

The second end 16 preferably is open, with a tube section 24 extending downwardly therefrom defining a pulp outlet. The tube 24 is preferably concentric with the axis A—A, as illustrated in the drawings.

Another major component of the degassifier 10 comprises the blade assembly 26, which includes a central hub 27, a plurality of blades 28, and a plurality of support members 29 extending radially from the hub 27 to the blades 28. Each blade 28 preferably include a radially-outwardmost edge 31, and a radially-inwardmost edge 32. The edges 32, 32 both are preferably substantially parallel to the housing 14, having substantially the same taper, and the edges 31 pass in very close proximity to the terminating end 22 of the pulp inlet pipe 20 during rotation of the blade assembly 26.

A shaft 34, mounted by a bushing assembly 35, which in turn is mounted by a conical support component 36 (attached to end cap 18) mounts the blade assembly 26 for rotation about an axis substantially coincident with the central axis A—A. The hub 27 may be keyed, bolted, or otherwise attached to the shaft 34. The end of the shaft 34 opposite the hub 27 is attached to a drive structure which comprises means for effecting rotation of the shaft 34 (and thus the blade assembly 26) about the axis A—A to impart a high speed rotational velocity component to pulp as it enters the housing 14. The rotating means are illustrated generally by reference number 38 (see FIGS. 2 and 3 in particular) and will be described in more detail hereinafter.

The degassifier 10 further comprises means defining a gas outlet adjacent the housing first end 15. Preferably, since the shaft 34 is mounted in the center of the end cap 18 of housing 14, the gas outlet comprises a plurality of openings 40 in end cap 18 radially spaced from and surrounding the center of the end cap 18. Pipes 41 lead from the openings 40, pass through the conical support 36, and extend exteriorly of the degassifier 10. Gas which passes through the pipes 41 may be discharged immediately into the atmosphere, or may be connected up to a suitable structure for removing and/or purifying components thereof. Means are provided for preventing short-circuiting of the pulp from the pulp inlet 20 to the gas outlets 40, and such means—as illustrated in FIG. 4—preferably comprise a conical tubular shroud 44 which surrounds the openings 40 but is spaced radially inwardly from the inlet 20 and from the innermost edges 32 of the blades 28. Preferably the taper of the shroud 44 is the same as the taper of the inward edges 32 of the blades 28, and a small radial clearance is provided between the shroud 44 and the blade edges 32, and they overlap axially.

The rotating means 38, as illustrated in FIGS. 2 and 3, include a large diameter driven sheave 46 keyed, or otherwise mounted, to the topmost portion of shaft 34. A driver sheave 48 is mounted for rotation with a shaft 49 about an axis B—B parallel to the axis A—A, and is preferably of smaller diameter than the sheave 46. An electric motor 50 or the like is operatively connected to the shaft 49 and sheave 48, and effects rotation thereof. A V-belt 52 operatively interconnects the sheaves 48, 46 to transfer the rotational movement of the sheave 48 to the sheave 46.

The motor 50 is mounted with respect to the housing 14 so that the position thereof may be adjusted to achieve the desired driving action. With reference to FIGS. 2 and 3, this may be accomplished by providing the support structure 55 extending upwardly and outwardly from a support base 56 and having a mounting plate 57. The support base 56 also supports the housing 14 via spider arms 59. The plate 57 is adapted to be overlaid by the plate 61, which has a plurality of elongated openings 60 formed therein. Bolts 62 passing through the elongated openings 60 pass through openings in plate 57 and are held in place by nuts 63 (see FIG. 3). The plate 61 is in turn bolted directed to the housing of the motor 50, as illustrated by structure 65 in FIG. 3. By loosening the four bolts 62 and sliding the plate 61 with respect to the plate 57, the position of the motor 50 with respect to the shaft 34 may be readily adjusted.

Utilizing the apparatus as described above, a method of simply and effectively degassifying paper pulp or the like may be practiced. The method is particularly applicable to pulp having a consistency of about 6 to 15%. Pulp with a 6 to 15% consistency is very thick, and is not subject to degassification utilizing techniques commonly applicable to liquids.

In degassifying pulp according to the present invention, the pulp is fed into the housing 14 through inlet 20 with a velocity component of the pulp intersecting a plane containing the central axis A—A of the housing 14. The blade assembly 26 is rotated at high speed to impart a high speed rotational velocity component to the pulp as it enters the housing. The resulting centrifugal force created on the pulp results in separation of the pulp and gas. Since the pulp is heavier it is forced to the periphery of the housing 14, and the gas is forced by displacement to the center of the housing 14. Due to the conical shape of the housing 14 and the location of the pulp outlet 24 at the bottom of the housing 14, movement of the pulp along the central axis A—A of the housing (with a whirling action) toward the outlet 24 is effected, gas within the pulp being "squeezed out" during this movement. The gas separated from the pulp passes upwardly to gas outlets 40, and ultimately is discharged through pipes 41. Short-circuiting of the pulp from pulp inlet 20 to gas outlets 40 is prevented by the shroud 44.

It will thus be seen that according to the present invention a simple and effective method, apparatus, and system have been provided for the degassification of pulp. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and methods.

What is claimed is:

1. A method of degassifying pulp having a consistency of about 6-15%, utilizing a degassifier comprising a housing tapering from a first end to a second end thereof along a central axis with a pulp inlet adjacent to the first end and a pulp outlet adjacent to the second end, and a rotatable blade assembly adjacent to the pulp inlet, and a gas outlet adjacent to the first end, comprising the steps of:

feeding the pulp into the housing through the pulp inlet with a velocity component intersecting a plane containing the central axis of the housing;

rotating the blade assembly to impart a high speed rotational velocity component to the pulp as it enters the housing;

effecting movement of the pulp along the central axis of the housing toward the pulp outlet while gas within the pulp is being squeezed out; and withdrawing gas separated from the pulp through the gas outlet adjacent the central axis and pulp inlet of the housing.

2. A method as recited in claim 1 comprising the further step of preventing short-circuiting of pulp from the pulp inlet to the gas outlet.

3. A method as recited in claims 1 or 2 comprising the further steps of mounting the degassifier on top of a pulp treatment vessel so that the central axis thereof is vertical with the pulp outlet below the pulp inlet, and directly discharging the pulp from the pulp outlet into the pulp treatment vessel.

4. A pulp degassifier comprising a housing substantially circular in cross-section and tapering inwardly from a first end thereof toward a second end thereof along a central axis;

means defining a pulp inlet to said housing adjacent said first end thereof, said pulp inlet extending along a line intersecting a plane containing said central axis;

means defining a pulp outlet adjacent said second end of said housing;

a blade assembly;

means for mounting said blade assembly adjacent said pulp inlet for rotation about an axis generally coincident with said housing central axis;

means defining a gas outlet adjacent said housing first end and adjacent said central axis;

means for preventing short-circuiting of pulp from said pulp inlet to said gas outlets, comprising a conically shaped shroud surrounding said gas outlet;

means for rotating said blade assembly about said axis of rotation thereof so that said blade assembly imparts a high velocity to the pulp;

said means for mounting said blade assembly for rotation comprising a shaft extending centrally into said housing through said first end thereof; and said means defining a gas outlet comprising: a top plate capping off said housing first end and receiving said shaft through a central opening thereof; means defining a plurality of openings in said top plate surrounding said shaft; and a conduit connected to each of said plurality of openings formed in said top plate surrounding said shaft.

5. A pulp degassifier comprising a housing substantially circular in cross-section and tapering inwardly from a first end thereof toward a second end thereof along a central axis;

means defining a pulp inlet to said housing adjacent said first end thereof, said pulp inlet extending along a line intersecting a plane containing said central axis;

means defining a pulp outlet adjacent said second end of said housing;

a blade assembly comprising a hub, a plurality of blades, and interconnections between said hub and blades; and wherein each of said blades having: a radially-outwardmost edge having a taper substantially parallel to said housing taper, and spaced in close proximity to said housing; and a radially-inwardmost edge extending substantially parallel to the radially-outwardmost edge of said blade;

means for mounting said blade assembly adjacent said pulp inlet for rotation about an axis generally coincident with said housing central axis;

means for rotating said blade assembly about said axis of rotation thereof so that said blade assembly imparts a high velocity to the pulp;

means defining a gas outlet adjacent said housing first end and adjacent said central axis; and means for preventing short-circuiting of pulp from said pulp inlet to said gas outlet, comprising a conically shaped shroud surrounding said gas outlet, the conical taper of said shroud being substantially the same as the taper of said blades radially-inwardmost edges, and said shroud and said blades being slightly radially spaced from each other, and axially overlapping.

6. A degassifier as recited in claim 5 wherein said means for mounting said blade assembly for rotation comprises a shaft extending centrally into said housing through said first end thereof, and wherein said means defining a gas outlet comprises a top plate capping off said housing first end and receiving said shaft through a central opening thereof, and means defining a plurality of openings in said top plate surrounding said shaft, and a conduit connected to each of said plurality of openings formed in said top plate surrounding said shaft.

7. A degassifier as recited in claim 4 or 5 wherein said means for mounting said blade assembly for rotation comprises a shaft extending along said central axis, a support extending axially outwardly from said housing first end and defining a central opening therein, and bearing means mounting said shaft for rotation, said bearing means received within said support central opening; and wherein said means for rotating said plate assembly comprises a driven sheave operatively engaging said shaft at an end thereof opposite said housing, a drive sheave, a V-belt interconnecting said sheaves, a motor for rotating said drive sheave, and means for mounting said motor for ready adjustment of the position thereof, and consequently the position of said drive sheave with respect to said driven sheave.

* * * * *